(12) United States Patent
Olsen et al.

(10) Patent No.: US 6,880,476 B2
(45) Date of Patent: Apr. 19, 2005

(54) RECESSES ON A SURFACE

(75) Inventors: Fred Olsen, Oslo (NO); Hans Oigarden, Oslo (NO)

(73) Assignee: Fobox AS, Hvitsen (NO)

( * ) Notice: Subject to any disclaimer, the term of this patent is extended or adjusted under 35 U.S.C. 154(b) by 0 days.

(21) Appl. No.: 10/470,514

(22) PCT Filed: Feb. 1, 2002

(86) PCT No.: PCT/NO02/00042
§ 371 (c)(1),
(2), (4) Date: Jul. 29, 2003

(87) PCT Pub. No.: WO02/064422
PCT Pub. Date: Aug. 22, 2002

(65) Prior Publication Data
US 2004/0083938 A1 May 6, 2004

(30) Foreign Application Priority Data
Feb. 2, 2001 (NO) .......................................... 2001 0579

(51) Int. Cl.[7] .................................................. B63B 1/34
(52) U.S. Cl. .................................................. 114/67 R
(58) Field of Search ............................ 114/67 R, 67 A; 296/180.1; 244/130, 199, 200

(56) References Cited

U.S. PATENT DOCUMENTS

| | | | | |
|---|---|---|---|---|
| 632,738 A | * | 9/1899 | O'Hara ...................... 114/67 R |
| 1,452,961 A | * | 4/1923 | Dornier .......................... 52/84 |
| 2,800,291 A | * | 7/1957 | Stephens ...................... 244/200 |
| 3,184,185 A | | 5/1965 | Brocard |
| 3,451,645 A | | 6/1969 | Wolcott |
| 4,753,401 A | | 6/1988 | Bechert |
| 5,074,234 A | * | 12/1991 | Stearns, IV ............ 114/102.13 |
| 5,386,955 A | | 2/1995 | Savill |
| 5,476,056 A | | 12/1995 | Tokunaga et al. |
| 5,481,996 A | * | 1/1996 | Osawa et al. ............. 114/67 R |
| 5,598,990 A | * | 2/1997 | Farokhi et al. ............. 244/199 |
| 5,988,568 A | * | 11/1999 | Drews ......................... 244/200 |

FOREIGN PATENT DOCUMENTS

| | | |
|---|---|---|
| DE | 3534268 A1 | 4/1987 |
| GB | 2068502 A | 8/1981 |

OTHER PUBLICATIONS

Norwegian Search Report dated Jun. 26, 2001of Norwegian Patent Application No. 2001 0579.

* cited by examiner

*Primary Examiner*—Stephen Avila
(74) *Attorney, Agent, or Firm*—Maine & Asmus

(57) ABSTRACT

Formations on the surface of bodies for reducing the drag relative to a medium which the body is located in or close to. The formations comprise a plurality of cavities (1,20,40, 60). The surface in which the cavities are formed is closed. The cavity has a disruption edge (5,25,44,66) adjacent to the cavity, with the disruption edge located upstream of the cavity, so as to set the flowing medium most proximal to the surface into turbulence upon passing the disruption edge. The cavity has a maximum depth from the surface of at least approximately 2 mm.

19 Claims, 6 Drawing Sheets

RECESSES ON A SURFACE

FIELD OF INVENTION

The present invention regards formations on the surface of bodies for reducing drag relative to a medium which the body is located in or close to, in accordance with the preamble of the accompanying Claim 1. In particular, the invention regards formations that reduce the water and/or air drag of a vessel, especially a ship. However the invention may also be applied to the inside of a pipe carrying gas and/or liquid, e.g. in a ventilation system, liquid conveyors such as conveyors for hydrocarbons, downpipes to hydroelectric power plants or in connection with wave power stations.

BACKGROUND OF THE INVENTION

From nature there is known a number of animals having surface formations that reduce the flow resistance. Birds have feathers that create a rough surface, and fish, sharks and rays have scales. Common to these surface formations is the fact that they break the laminar air or water flows along the surface of the body, creating small areas of turbulence. The laminar flows give a high flow resistance, as the velocity of the flow medium relative to the body is approximately equal to zero near the surface. Thus a thin layer of the flow medium forms near the surface, exerting drag on the body. A rough surface will break up this layer and create small turbulent currents. Thus the flow resistance is reduced substantially.

Several surface formations are known which make use of this effect.

U.S. Pat. No. 3,184,185 shows formations on the upper side of aeroplane wings. Holes have been punched in the surface. The punched part of the hole projects like a tongue at an angle relative to the surface. Due to the shape of the holes, air will be drawn out through these from the inside of the wing. This airflow creates an upward force, which imparts lift.

U.S. Pat. No. 3,451,645 describes a device similar to the foregoing. Here, curved lamellas are arranged on the upper side of the wing. A slot is formed between each of the lamellas. Air flows out through this slot from the inside of the wing, and then along the curve of the lamella.

U.S. Pat. No. 4,753,401 describes elements mounted on the surface of a body. Each element has openings 8, above which are disposed ribs 4 with shallow grooves 5 between the ribs. Several elements are placed one after the other, so that the openings and ribs are in line. Between every element is formed a slit 9 that communicates with a passage 6B across the passage 6A formed by the openings 8. When a low pressure fluid flows past, fluid will be drawn out from passages 6A and 6B. When a high pressure fluid flows past, fluid will flow into passages 6A and 6B. This should then result in a reduced flow resistance.

U.S. Pat. No. 5,386,955 describes a surface with protrusions in the form of generally triangular ribs. Some relatively large ribs are formed, and a larger number of smaller ribs are formed between these. One embodiment includes triangular ribs with an increasing cross-section in the direction of flow.

U.S. Pat. No. 5,476,056 describes various formations on the surface of a ship's hull. In some embodiments, these are undulating projections. In other embodiments, they are more irregular projections. Air is introduced to the surface in order to form a layer of air.

Even though some of the known surface formations have a certain effect when it comes to reducing flow resistance, they are still encumbered by a number of disadvantages. The devices according to U.S. Pat. No. 3,184,185 and U.S. Pat. No. 3,451,645 are dependent on there being a cavity inside the surface, from which air may flow. U.S. Pat. No. 5,386,955 describes the provision of very small, generally triangular ribs with a height of the order of 70 $\mu$m, which in some embodiments are disposed across the direction of flow and in other embodiments along the direction of flow. Although some turbulence is created at these ribs, this turbulence will have a limited effect due to the size of the ribs. These ribs are only suitable at very high velocities, around Mach 0.5. At lower velocities such as those found for ships and fast-moving boats, these ribs will have little or no effect. Moreover, the ribs will be completely covered by the anti-fouling applied to the hull, thus reducing the effect to nil.

U.S. Pat. No. 5,476,056 prescribes the introduction of air to the hull surface. This requires the installation of costly pumping equipment and energy in order to run.

U.S. Pat. No. 4,753,401 is probably the best design of the above, but is far from ideal, and in addition it is highly complex in manufacture.

In addition, surface formations for turbine blades are known from GB 2 068 502. These are either in the shape of hairs or raised parts. The raised parts are in the shape of half cones resting on the surface.

Furthermore, surface formations are known from DE 3 534 268 in the shape of thin blades projecting from the surface or in the shape of tapering triangles with an increasing height in the direction of flow.

The disadvantage of having formations in the shape of raised parts is first of all that they are easily damaged by external influences. Moreover, it has been found that they do not have as good an effect as cavities of a complementary shape.

SUMMARY OF THE INVENTION

The present invention aims to overcome the above disadvantages, and further to optimise the effect, both with regard to efficiency, economy, fabricatability and maintenance. It is also an aim to provide surface formations that are suited for use at low and moderate velocities such as those found for ships, fast-moving boats, hydroelectric pipes, but also for passenger planes at moderate velocities. This is achieved by the characteristics that according to the present invention are given in the characterising part of Claim 1.

Preferred embodiments are given in the dependent claims.

BRIEF DESCRIPTION OF THE FIGURES

The invention will now be described in greater detail with reference to the attached figures, in which.

DESCRIPTION OF THE PREFERRED EMBODIMENT

Figure 1:
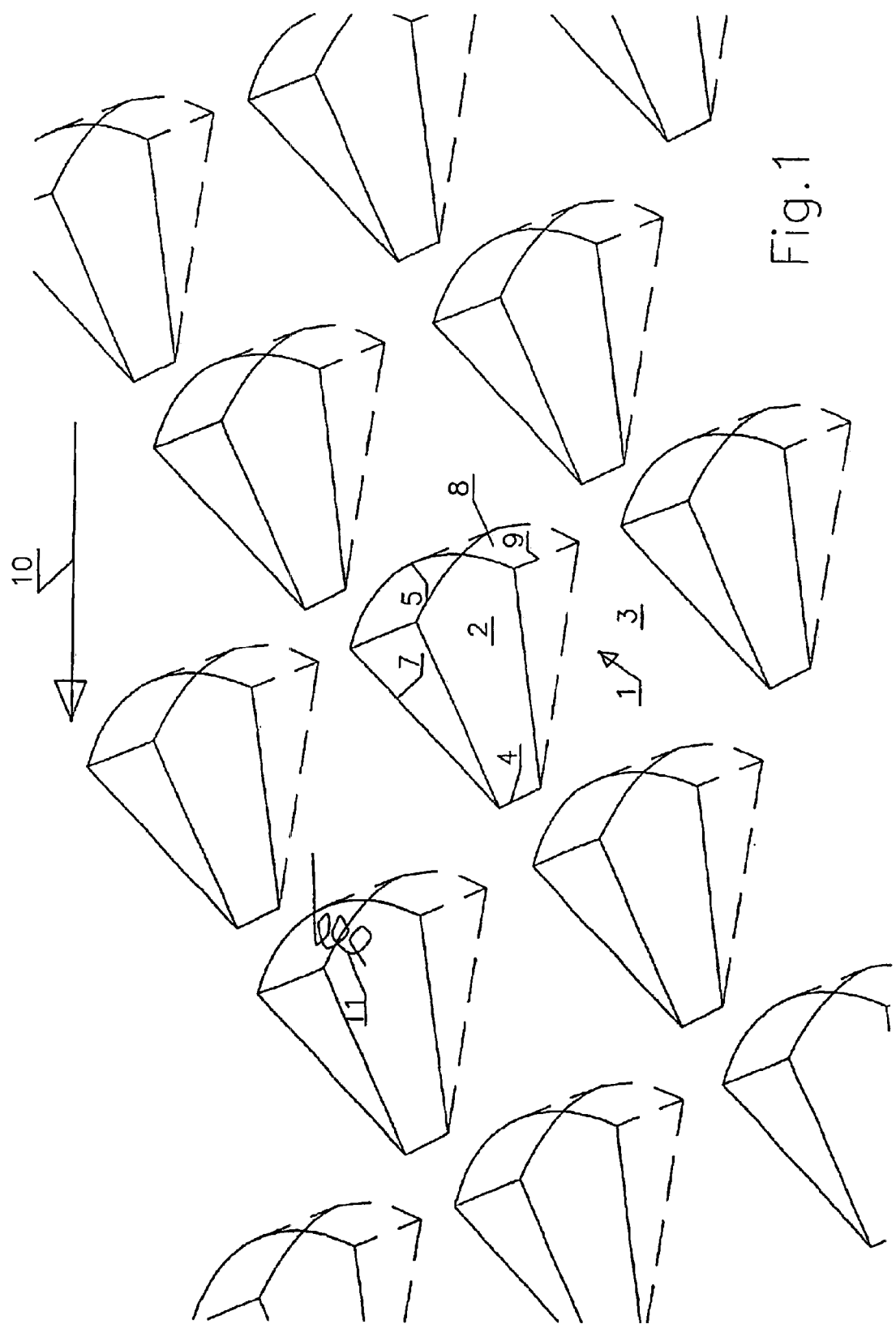
FIG. 1 is a perspective view of a section of surface formations according to the invention.
Figure 2:
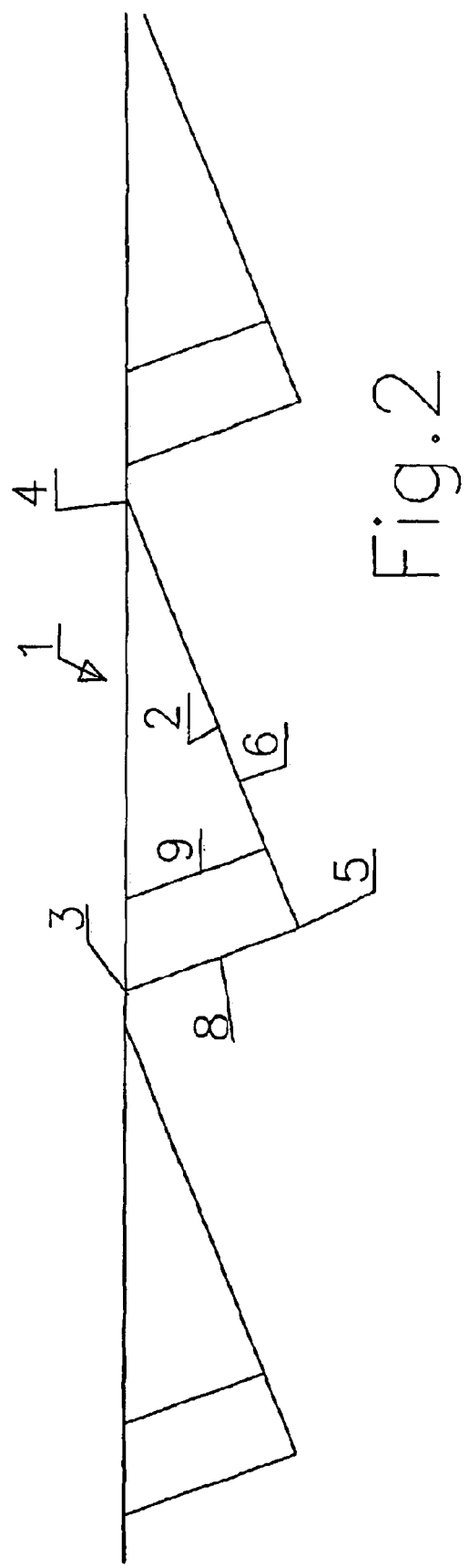
FIG. 2 is a longitudinal section of the surface formations of FIG. 1.

FIGS. 1 and 2 show surface formations in perspective and as a section along the direction of flow, respectively. The surface formations 1 are cavities formed on a surface 3, which may be the surface of a ship's hull. Each surface formation 1 has an inclined bottom surface 2 that extends down from the surface 3 at an angle, from a downstream edge 4 situated in the plane of the surface 3 to an upstream disruption edge 5 situated at a distance below the surface 3. This distance is at least 1 mm, preferably 5–15 mm, but may also be as much as 25 mm, depending on the velocity of flow past the surface formation 1. The length of the bottom surface 2 is preferably 15–60 mm or more, but it may also lie outside this range, depending on the velocity of flow past the surface formation 1.

Edges 6 and 7 extend between the downstream edge 4 and the upstream disruption edge 5. They converge from the downstream edge 4 towards the upstream disruption edge 5, making the bottom surface 2 wider at the upstream end than at the downstream end. Side walls 9 exist between the edges 6 and 7, respectively, and the surface 3. The disruption edge 5 and the edges 6 and 7 all act as disruption edges to the medium flowing past the surface formation 1.

From the upstream disruption edge 5 there also extends an end wall 8 down from the surface 3. The end wall 8 is curved, so as to give a horizontal section of the surface formation 1 the general shape of a piece of pie. However the end wall 8 may also be straight, so as to give the surface formation the shape of a truncated triangle.

The arrow 10 indicates the direction of fluid flow past the surface formation 1, which may be disposed e.g. below the waterline on the surface of a ship. The water flows over the disruption edge 5 and also over the edges 6, 7. Here, the laminar flow is broken up, and the adherence of the water to the surface 3 is reduced considerably.

Figure 3:
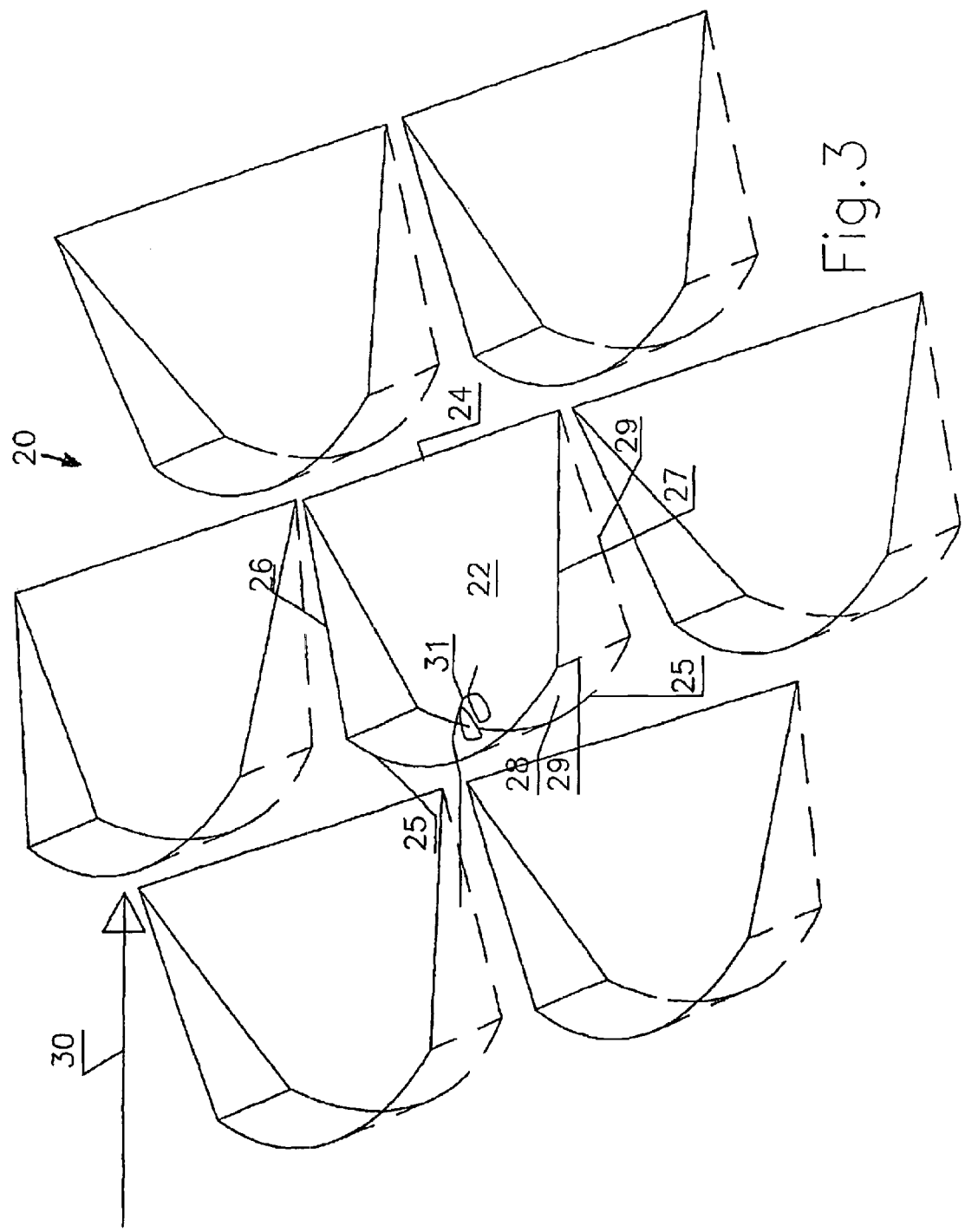
FIG. 3 shows another embodiment of surface formations according to the invention.

FIG. 3 shows surface formations 20 generally shaped in the same manner as the surface formation 1 of FIG. 1, but here the edges diverge instead of converge. Thus the surface formations 20 comprise a bottom surface 22 that extends at an angle into the surface from a downstream edge 24 to an upstream edge 25. Edges 26 and 27 extend between the downstream edge 24 and the upstream edge 25. There are side walls 29 between the edges and the surface.

These edges diverge from the upstream edge towards the downstream edge, so that the bottom is wider at the downstream end than at the upstream end.

An end wall 28 extends from the upstream edge 25 and down from the surface 3. The end wall 28 is curved, so as to give a horizontal section of the surface formation 20 the general shape of a piece of pie. However the end wall 28 may also be straight, giving the surface formation the shape of a truncated triangle. Sectioned vertically, the surface formation 20 has the same shape as the surface formation 1.

In FIG. 3, the arrow 30 indicates the direction of flow past the surface formations 20. If the surface formations 20 are arranged e.g. on a ship's hull, the laminar water flow will be broken up at the upstream edge 25, which acts as a disruption edge, creating a turbulent swirl 31 across and partly down into the cavity formed by the surface formation 20.

The greatest depth of this cavity is at least 1 mm, preferably 5–15 mm, but may also be as much as 15 mm, depending on the velocity of flow past the surface formation 20. The length of the bottom surface 22 is preferably 15–60 mm or more, but may also lie outwith this range, depending on the velocity of flow past the surface formation 20.

The surface formation 20 of FIG. 3 is best suited for flow velocities of more than approximately 40 knots.

Figure 4:
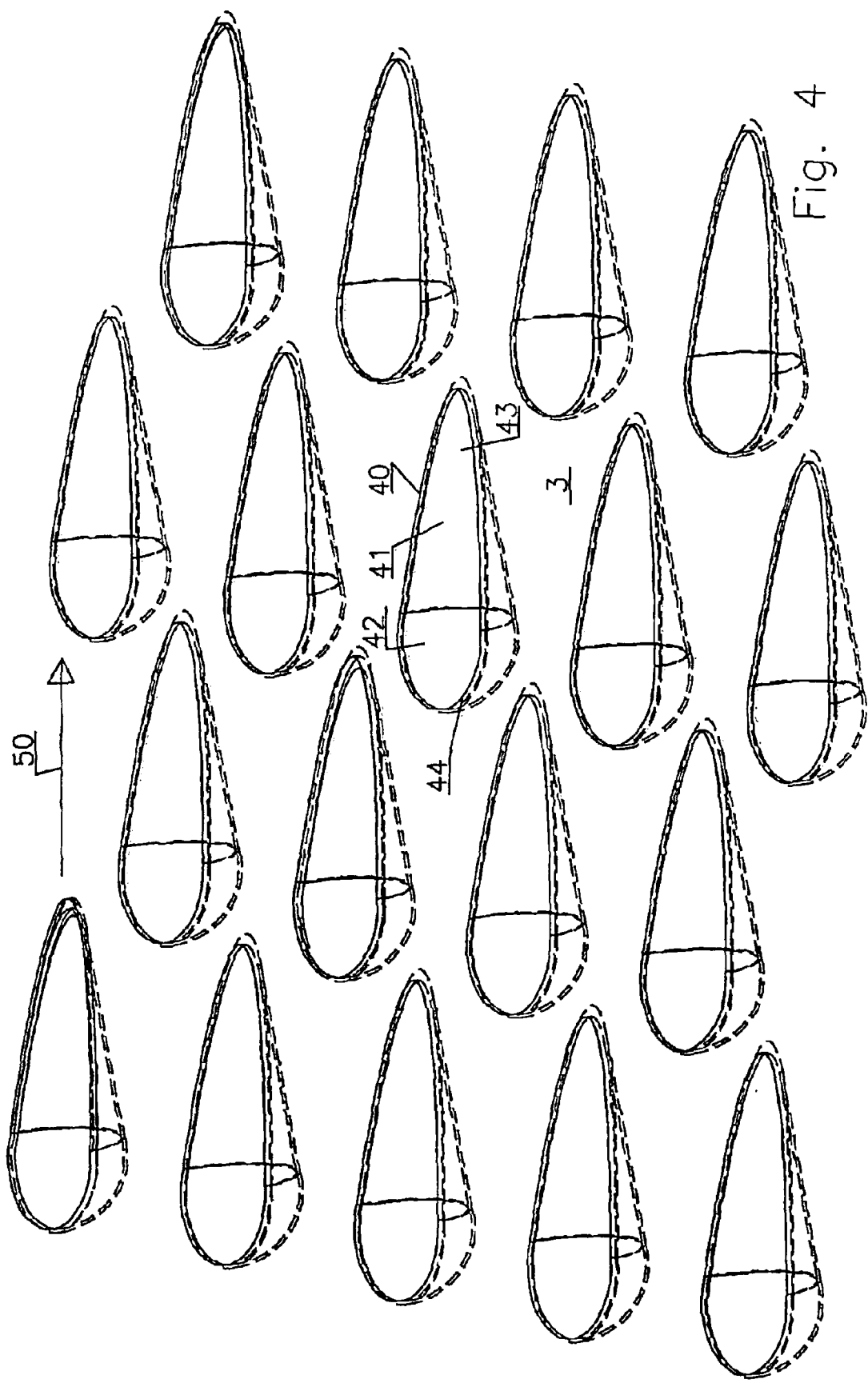
FIG. 4 shows a third embodiment of surface formations according to the invention.
Figure 5:
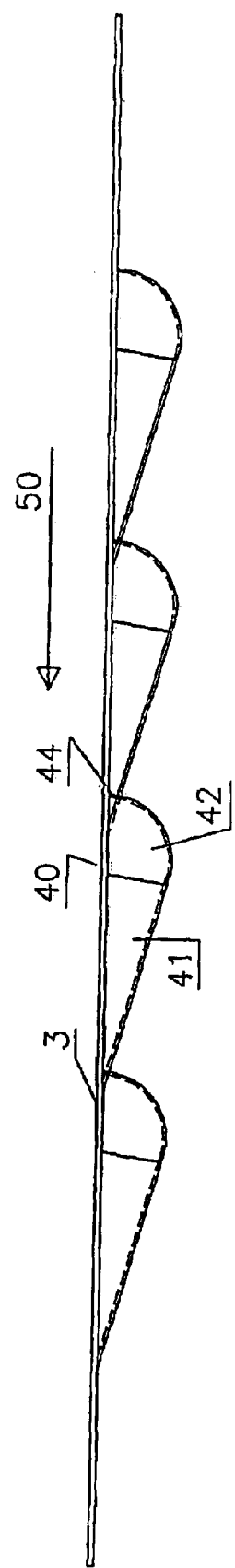
FIG. 5 is a longitudinal section of the surface formations of FIG. 4.

FIGS. 4 and 5 show a surface formation 40 generally shaped as a guttiform cavity 41. The widest end 42 of the guttiform cavity 41 has the general shape of a sector of a sphere and faces downstream while the narrowest end 43 has the general shape of a sector of a cone with its pointed end facing upstream. At the wide end, an edge 44 is formed against the surface 3. This edge acts as a disruption edge for the flow along the surface 3. The flowing medium flows in the direction of arrow 50, breaking up into a turbulent swirl at the edge 44. The greatest depth of the cavity 41 is at least 1 mm, preferably 5–15 mm, but may also be as much as 25 mm or more, depending on the velocity of flow past the surface formation 40. The length of the cavity in the direction of flow preferably lies in the range 15–60 mm.

Instead of tapering in the downstream direction, this surface cavity may also widen in the downstream direction, as shown in the embodiment of FIG. 3.

Figure 6:
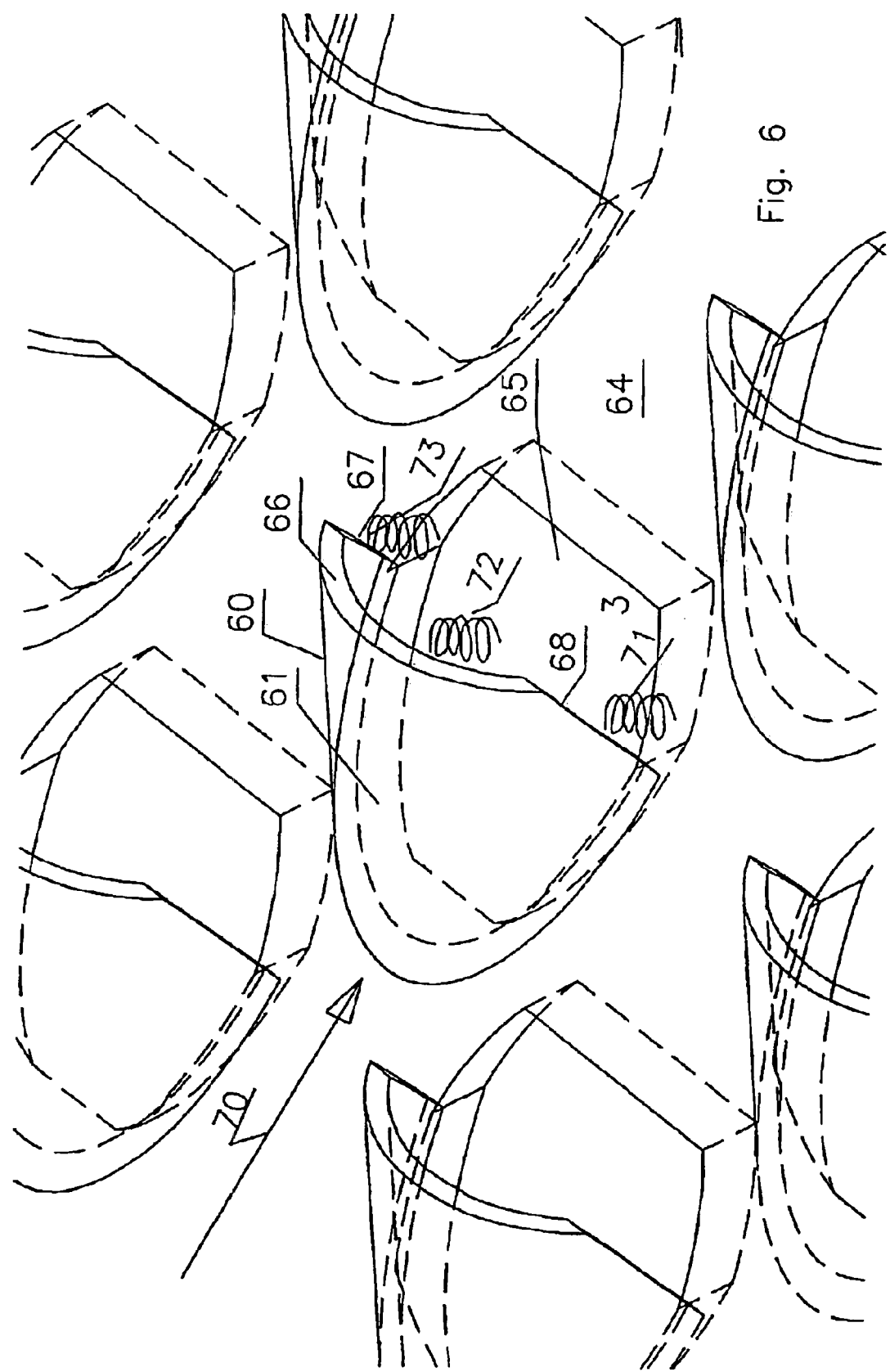
FIG. 6 shows farther surface formations.

FIG. 6 shows a further surface formation. This is best suited for lower velocities of less than approximately 15 knots. The surface formation 60 is formed by a screen shaped wall 61. The wall 61 may be part e.g. of a truncated cone or part of a cylinder wall in a diagonal cylinder. Thus the wall 61 exhibits a convex shape upstream and a concave cavity 62 downstream. A top edge 66 and two side edges 67 and 68 are formed along the wall 61. These edges act as disruption edges for the flow medium.

Preferably, the wall 61 is produced by punching it from a plate 64, thereby creating a hole 65. The plate 64 may then be fixed to the surface 3, so that the surface 3 closes the hole 65. The fixing agents may be glue, rivets, screws, welding etc., all depending on the materials of the plate 64 and the surface 3. The flow medium flows in the direction of arrow 70. When the flow medium, e.g. water, impinges on the wall 61, it will be deflected to either side of and up along the screen-shaped wall 61. When the water flows past side edges 67, 68 and top edge 66, which act as disruption edges, a turbulent swirl 71, 72 and 73 is created. In this manner, the laminar flow along the surface 3 is broken.

The height of the surface formation 60 is at least 1 mm, preferably 5–15 mm, but may also be as much as 25 mm or more, depending on the velocity of flow past the surface formation. The length of the surface formation in the direction of flow preferably lies in the range 15–60 mm.

As can be seen from FIGS. 1, 3, 4 and 6, the surface formations have been arranged in a slightly staggered manner, preferably in rows, so that the surface formations in one row are positioned between the surface formations in the adjacent row.

As mentioned by way of introduction, the present invention may also be applied to the inside of pipes, both for existing pipe trenches or similar. In e.g. ventilating chimneys, strips with the described surface formations may be taped in place. Here, the strips may be made from e.g. plastic. In new pipes carrying liquid, similar surface formations may be installed in the form of a ring at the flow end of the pipe, so as to provide a turbulence ring at each pipe joint. The closer these rings are, the higher the velocity of flow. The material, e.g. the plastic, must be rigid enough to break the laminar layer. If the material of these turbulence rings is too soft, the effect will disappear.

The surface formations may also be used at the entering edge of aeroplane wings or windmill blades.

What is claimed is:

1. Formations on the surface of a body for reducing drag relative to a medium which the body is located in or close to, where the formations comprise a plurality of recesses disposed within said surface, wherein the surface is closed, that each recess of said plurality of recesses has a disruption edge adjacent to said recess, said edge extending generally transverse to the direction of the flow of said medium and being located upstream of said recess in a manner such that said medium most proximal to the surface is set into turbulence upon passing the disruption edge, and said recess has a maximum depth from the surface of at least approximately 2 mm.

2. Formations according to claim 1, wherein the bottom of said recess has an increasing width in the direction of flow.

3. Formations according to claim 2, wherein the bottom of said recess starts at the disruption edge at a curved end wall.

4. Formations according to claim 1, wherein said recess has a downstream disruption edge in the plane of the surface and an upstream portion with a decreasing depth in the direction of flow.

5. Formations according to claim 4, wherein said recess is generally guttiform, with the narrow end of the drop shape facing downstream.

6. Formations according to claim 4, wherein said recess has a generally flat bottom surface that, in the direction of flow, extends towards and coincides with the surface.

7. Formations according to claim 6, wherein the depth of said recess is at least 5 mm.

8. Formations according to claim 7, wherein the depth said recess is between 5 mm and 15 mm.

9. Formations according to claim 1, wherein the depth said recess is at least 5 mm.

10. Formations according to claim 9, wherein the depth said recess is between 5 mm and 15 mm.

11. Formations according to claim 2, wherein the depth said recess is at least 5 mm.

12. Formations according to claim 11, wherein the depth said recess is between 5mm and 15 mm.

13. Formations according to claim 3, wherein the depth of said recess is at least 5 mm.

14. Formations according to claim 13, wherein the depth of said recess is between 5 mm and 15 mm.

15. Formations according to claim 4, wherein the depth of said recess is at least 5 mm.

16. Formations according to claim 15, wherein the depth of said recess is between 5 mm and 15 mm.

17. Formations according to claim 5, wherein the depth of said recess is at least 5 mm.

18. Formations according to claim 17, wherein the depth of said recess is between 5 mm and 15 mm.

19. Formations according to claim 1 wherein said disruption edge is curved.

* * * * *